W. LENNON.
CLAMPING DEVICE.
APPLICATION FILED MAR. 21, 1914.
1,167,418.
Patented Jan. 11, 1916.
2 SHEETS—SHEET 1.
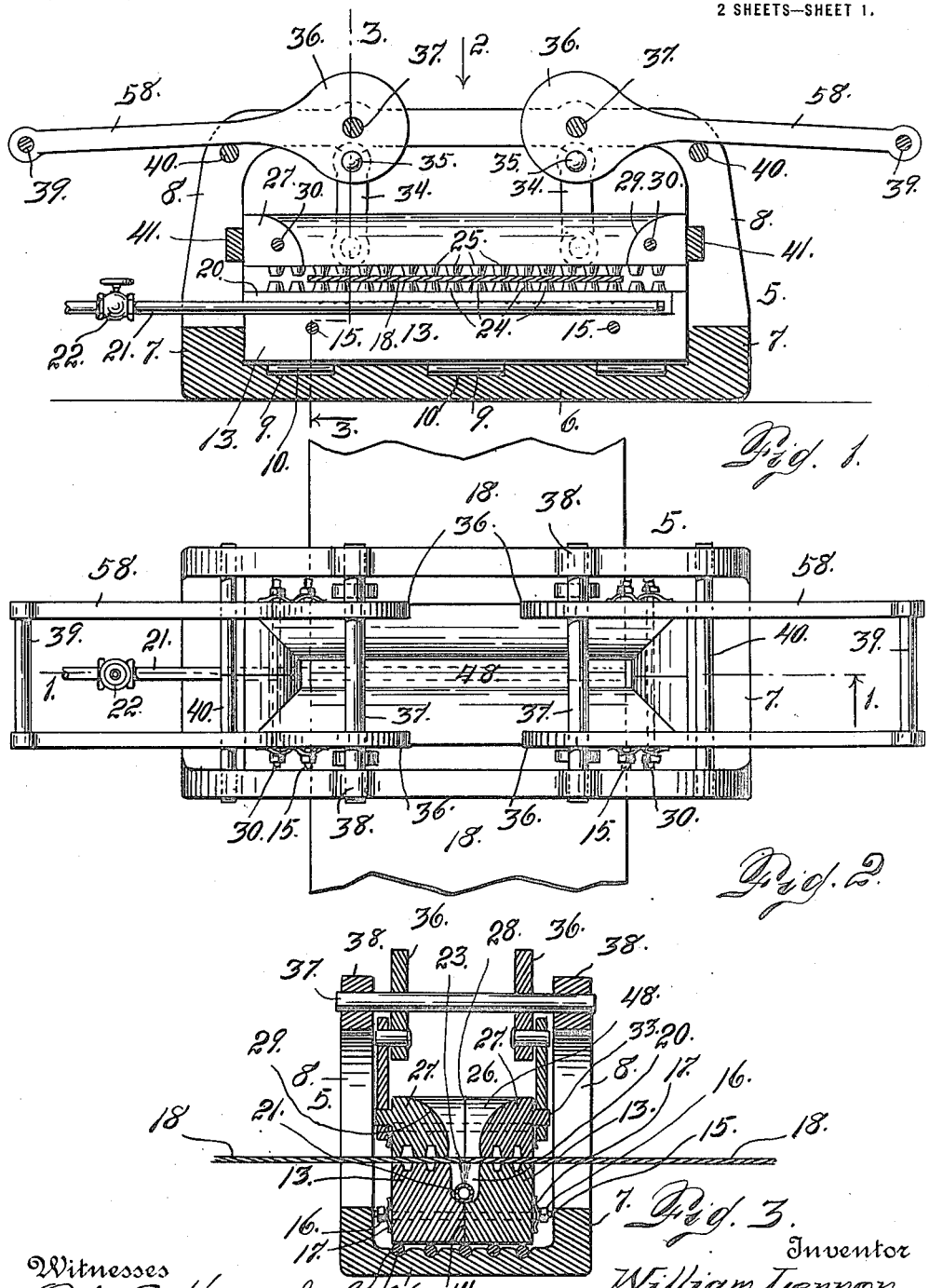
Witnesses
Otto E. Hoddick
L. E. Petersen
Inventor
William Lennon
Attorney

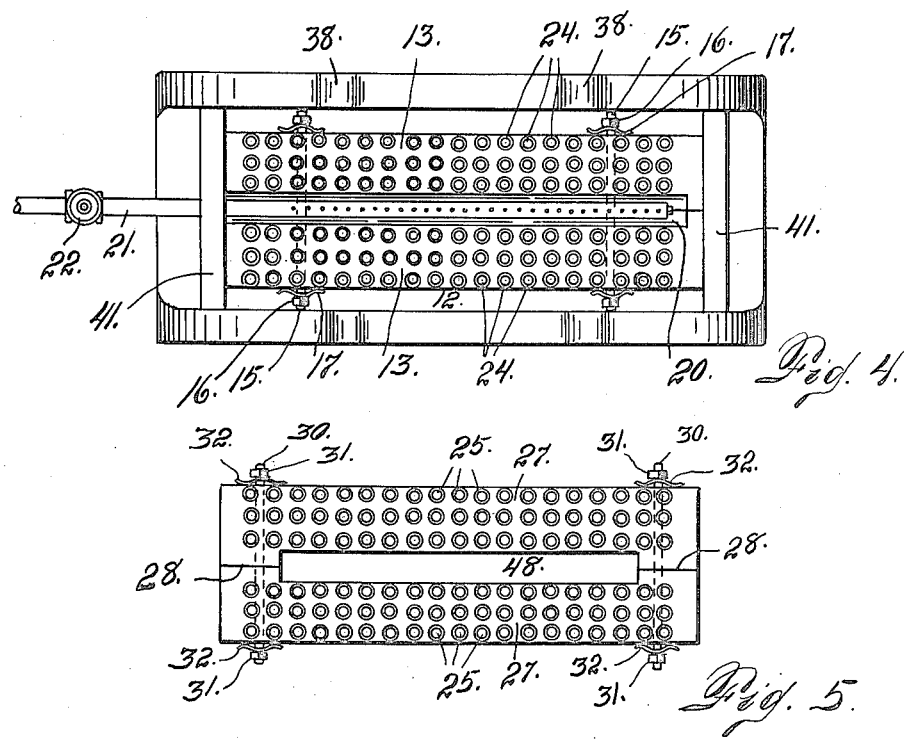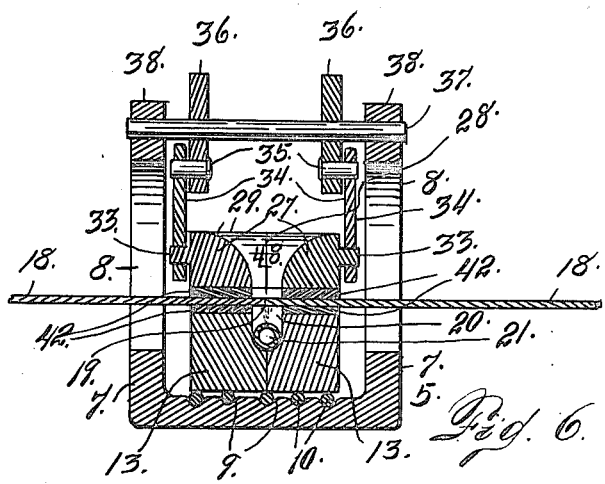

UNITED STATES PATENT OFFICE.

WILLIAM LENNON, OF MANITOU, COLORADO.

CLAMPING DEVICE.

1,167,418.  Specification of Letters Patent.  Patented Jan. 11, 1916.

Application filed March 21, 1914. Serial No. 826,161.

*To all whom it may concern:*

Be it known that I, WILLIAM LENNON, citizen of the United States, residing at Manitou, El Paso county, Colorado, have invented certain new and useful Improvements in Clamping Devices; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in clamping devices, more especially intended for clamping and thus securing sections of sheet metal whose abutting edges are to be welded by oxy-acetylene, oxy-hydrogen or other suitable gas welding processes.

My object is to weld relatively short sections of sheet metal whereby strips or plates of indefinite or any desired lengths may be obtained.

My further object is to provide long lengths of the character stated for use in constructing sheet metal flumes, culverts, roofing, etc.

Heretofore, as far as I am aware, it has been impossible to weld sheet metal sections in such a manner that they have when finished, the same general appearance, efficiency and strength at the joint as the balance of the sheet. Difficulty has been encountered in properly clamping the edges of the metal to be welded, so that a smooth surface would result. Another difficulty that has existed is to properly control the expansion of the metal during the welding operation in order that such expansion will be equally distributed throughout the entire area to be welded; and still another difficulty has been to get rid of the heat from the plate and prevent a great amount of it from being absorbed by the clamping device, thereby requiring more gas and time to accomplish the work than would otherwise be required. Heretofore, as far as I am aware, it has been impossible for rolling mills to overcome these difficulties, which is the object of my invention and to this end I employ a clamping device composed of two members, one arranged above the other, coöperating clamping faces being constructed either to prevent the heat from entering the clamping members to any large extent, or to provide a circulation between the clamping faces whereby the heat may be disseminated in order to overcome the aforesaid difficulty. In this last named construction, the faces of the clamping members are each provided with a series of projections which are sufficient in number to properly clamp the sheet metal sections, while at the same time they are sufficiently separated to permit the escape of the heat. In the other form of construction, the coöperating faces of the clamping members are provided with an asbestos covering to prevent the heat from entering the clamping members to any large extent, since the asbestos is a poor heat conductor. Furthermore, the clamping members are each divided into two parts whereby they are allowed to move in the direction of the expansion of the metal when heated, thus preventing the abutting edges to be welded from bending upwardly, or otherwise getting out of shape due to the unequal expansion of the metal. Furthermore, one of the clamping members is equipped with means for preheating the abutting edges of the metal, preferably by means of a gas flame or other means such as a hot electric plate, thereby causing equal expansion due to the heat imparted, by keeping the edges of the metal the entire length to be welded, at a comparatively high temperature, both before and after the welding torch has been applied. This preheating can occur before the clamping members are firmly tightened on the metal, so that the additional expansion resulting from the difference between the heat imparted by the gas flame and welding torch will cause less trouble. This method also saves welding gas and shortens the time required during which the torch must be used in any given case.

Having briefly outlined my improved construction, I will proceed to describe the same in detail, reference being made to the accompanying drawing in which is illustrated an embodiment thereof.

In this drawing, Figure 1 is a vertical section taken through my improved clamping device on the line 1—1, Fig. 2. Fig. 2 is a top plan view of the construction or a view looking in the direction of the arrow 2, Fig. 1. Fig. 3 is a cross section taken on the line 3—3, Fig. 1, looking toward the left. Fig. 4 is a top plan view of the frame work of the structure, showing the lower clamping member, the upper member being removed. Fig. 5 is an underneath view of the upper clamping member. Fig. 6 is a section similar to Fig. 3, but showing another form of construction.

The same reference characters indicate the same parts in all the views.

Let the numeral 5 designate a relatively stationary frame work, consisting of a bottom part 6 and upwardly projecting parts 7 at the sides and ends of the device. These parts 7 merge into arches 8 which are arranged on opposite sides of the structure. The upper surface of the lower part of the frame is grooved as shown at 9, to receive anti-frictional devices 10, upon which the lower clamping member 12 rests. These anti-frictional devices which as illustrated on the drawing, consist of rollers, are so arranged as to permit lateral movement of the two parts 13, of which the clamping member 12 is composed. This member is centrally divided, as shown at 14, and the parts are connected in any suitable manner as by bolts 15, whose extremities are equipped with nuts 16, which are spaced from the outer surfaces of the parts and are engaged by interposed bow-shaped springs 17, which allow a limited degree of lateral movement of the parts 13 to correspond with the expansion in a lengthwise direction of the metal sections 18, whose abutting edges 19 are to be welded. In the central part of the member 12 and extending lengthwise thereof, is a groove 20 in which a pipe 21 is located, the said pipe being connected with a source of gas supply which is controlled by a valve 22. This pipe is provided with a row of top perforations through which the gas escapes and when lighted, forms jets 23 of flame which act upon the abutting edges of the sheet metal sections to be welded and also upon the adjacent area of these sections. In this manner the edges to be welded may be given a relatively high heat before the welding operation takes place. If desired, these edges may be heated to a red heat before the welding operation which is accomplished by means of a torch, commences. In this manner the expansion of the sections results largely before the welding operation commences, whereby the additional expansion due to the high degree of heat applied for welding purposes results in comparatively little difficulty of the character heretofore explained.

The clamping member 12 is located within the relatively shallow receptacle formed by the upwardly projecting parts 7 of the bed part 6 of the frame work. The upper surface of this member is equipped with a series of separated projections 24, which are arranged coincidently with similar projections 25, formed on the upper member 26 of the clamping device. This upper member is also divided into two parts 27, the line of division being indicated at 28. The central part of the member 26 is open from above as shown at 48, whereby the abutting edges of the sections 18 to be welded are exposed for welding purposes, the opening 48 being sufficiently large to permit the introduction of the gas torch whereby a flame having an exceedingly high degree of heat is brought in direct contact with the abutting edges of the sheet metal sections. As shown in the drawing, the walls of the recess or opening 48 are curved, as shown at 29, both at the sides and ends. The lower part of the opening 48 registers with the groove or recess 20 of the lower clamping member, in which the gas pipe 21 is located, as heretofore explained. The two parts of the upper clamping member are also connected by bolts 30 which are provided with nuts 31, spaced from the connected parts of the member, bow-shaped springs 32 being interposed to permit a limited degree of lateral expansion to correspond with the lateral separation of corresponding parts of the lower clamping member and also to correspond with the expansion of the sheet metal sections when subjected to heat as heretofore explained.

Each part 27 of the upper clamping member is provided with projections 33 whereby these parts are connected by means of links 34 with wrist pins 35, with which bell crank levers 36 are provided. These levers are pivotally connected with shafts or spindles 37, mounted in the upper rails 38 of the side arches 8 of the frame work of the structure. The levers 36 are provided with manipulating arms 58. There are two pairs of these levers and each pair of arms is connected by a rung 39 for convenience of manual operation. When the upper member is in the clamping position (see Fig. 1), the arms 58 of the levers rest upon stop rungs 40 which are mounted in the side arches of the frame at opposite ends. The upper clamping member 26 is held in place at its extremities by means of transversely arranged bars 41, which are integral with the frame work.

From the foregoing description, the operation of my improved construction as thus far described, will be readily understood. Assuming that the upper clamping member 26 is raised or separated from its co-operating clamping member 12, the sheet metal sections 18 will be introduced through the openings in the side arches 8 of the frame work, and pass between the clamping members whereby their free edges are brought into the abutting relation and these edges are exposed both above and below,— below by means of the groove or recess 20 through which the jets of gas flame pass to the undersurface of the abutting edges of the plates,—and from above, through the opening or cavity 48 which permits the use of the welding torch, as heretofore explained. Before the upper clamping member has been forced down to the limit permitted by the use of the cams, the gas may be turned on by opening the valve 22, and the gas jets lighted, transforming them into jets 23 of flame, which act directly upon the abutting edges of the two parts 18, with the result that these edges of the two parts are heated to a considerable degree. The upper clamping member is forced downwardly upon the two sheets, after which the gas torch is brought into requisition and the flame issuing therefrom is brought into direct contact with the abutting edges of the plates 18, whereby these edges are melted and welded to form a substantially integral device. This welding operation by the use of the gas torch, is quickly accomplished by reason of the great degree of heat which is obtained by these torches. As soon as one of the joints is welded, the sheets may be moved along between the clamping members, the upper clamping member being raised for the purpose until the free extremity of one of the sheets is brought into the proper position between the clamping members, after which another section will be welded thereto in the same manner. In this way, sheet metal plates of any suitable width may be made of any desired length. These relatively long plates are exceedingly advantageous for use in forming open sheet metal flumes, culverts, roofing, etc., as heretofore indicated, since they reduce the number of overlapping joints.

In the form of construction shown in Fig. 6, the clamping faces of the two members are provided with a cover 42 of asbestos, or with other suitable non-combustible material which is also a poor conductor of heat. By virtue of this construction, a comparatively small amount of heat will be absorbed or taken up by the clamping members. This construction may be employed instead of the form shown in the other views, if it should be found desirable.

Having thus described my invention, what I claim is,—

1. A clamping device for use in welding metal sheets, comprising upper and lower coöperating members arranged to clamp the edges of the plates to be joined, the upper member having an opening extending lengthwise of said edges to permit the introduction of the welding torch, means for bringing the two members into coöperative relation and means for subjecting the metal sheets along the entire length of the abutting edges to a moderate degree of heat prior and during, to the use of the welding torch.

2. A clamping device for use in welding sheet metal sections, said device comprising upper and lower members between which the sheets are placed, and means for bringing the edges of said members into coöperative clamping relation, one of the members being equipped with means for heating the metal sheets in advance of the use of the welding torch, and the other member having an opening extending lengthwise of the said edges to permit the introduction of the welding torch.

3. A clamping device of the character described, comprising upper and lower members between which metal sections to be welded may be placed, means for bringing the members into coöperative clamping relation, one of the members having a centrally located recess and a perforated pipe located in the said recess and adapted to supply fuel for heating the abutting edges of the plates to be joined, while the other member is provided with an opening opposite said recess to permit the introduction of the welding heating device.

4. A clamping device comprising upper and lower members arranged to engage the plates to be joined adjacent their abutting edges, means for bringing the two members into coöperative clamping relation, the upper member having a central opening extending lengthwise of said edges to permit the introduction of a welding torch, each member being composed of two parts and the two parts of each member being connected to permit expansion for the purpose set forth.

5. A clamping device comprising two coöperating members, each member consisting of two parts connected to permit lateral expansion, and anti-frictional devices upon which the lower member is supported, to facilitate lateral movement, substantially as described.

6. A clamping device comprising a relatively stationary frame, two coöperating clamping members arranged one above the other, anti-frictional devices upon which the lower member is supported, each member consisting of two parts connected to permit a limited degree of lateral separation, and suitable means connected with the upper member for raising and lowering the latter, substantially as described.

7. A clamping device comprising a relatively stationary frame, two coöperating clamping members arranged within the frame, one above the other, each member consisting of two parts yieldingly connected to permit lateral expansion, the coöperating faces of the two members having series of spaced projections coincidently arranged, the lower member having a groove and a perforated gas pipe arranged in said groove, the upper member having a central opening to permit the introduction of a welding torch, substantially as described.

8. A clamping device comprising upper and lower coöperating members arranged to clamp the edges of plates to be joined, the upper member having an opening extending lengthwise of said edges to permit the introduction of the welding torch the entire length of said edges, each clamping member consisting of two parts connected to permit expansion.

9. A clamping device comprising upper and lower coöperating members arranged to clamp the edges of plates to be joined, the upper member having an opening extending lengthwise of said edges to permit the introduction of the welding torch the entire length of said edges, the lower member having a recess located opposite the opening in the upper member, said recess being adapted to receive a preheating instrumentality.

10. A clamping device comprising a relatively stationary frame, two coöperating clamping members arranged within the frame one above the other, the coöperating faces of the two members having a series of spaced projections coincidently arranged, the lower member having a groove, and a perforated gas pipe arranged in said groove, the upper member having a central opening to permit the introduction of a welding torch, substantially as described.

11. A clamping device comprising upper and lower coöperating members arranged to clamp the edges of plates to be joined, the upper member having an opening extending lengthwise of the said edges to permit the introduction of a welding torch, each member consisting of two parts to permit expansion, the lower member having a recess located opposite the opening in the upper member, the said recess adapted to receive a preheating instrumentality.

12. A clamping device comprising upper and lower coöperating members arranged to clamp the edges of plates to be joined, the upper member having an opening extending lengthwise of the said edges to permit the introduction of a welding torch, each member consisting of two parts to permit expansion, the lower member having a recess located opposite the opening in the upper member, the said recess adapted to receive a preheating instrumentality, the coöperating faces of the two members having spaced projections coincidently arranged.

13. A clamping device comprising upper and lower coöperating members arranged to clamp the edges of plates to be joined, the upper member having an opening extending lengthwise of the said edges to permit the introduction of a welding torch, each member consisting of two parts to permit expansion, the lower member having a recess located opposite the opening in the upper member, the said recess adapted to receive a preheating instrumentality, the coöperating faces of the two members being constructed to facilitate the escape of heat to prevent an excess accumulation in said members, substantially as described.

In testimony whereof I affix my signature in presence of two witnesses.

WILLIAM LENNON.

Witnesses:
MAZE KIRLY,
A. EBERT O'BRIEN.